(12) United States Patent
Patton et al.

(10) Patent No.: US 12,212,584 B2
(45) Date of Patent: Jan. 28, 2025

(54) SYSTEMS AND METHODS IDENTIFYING MALICIOUS COMMUNICATIONS IN MULTIPLE MESSAGE STORES

(71) Applicant: KnowBe4, Inc., Clearwater, FL (US)

(72) Inventors: Mark William Patton, Clearwater, FL (US); Steffan Perry, New Port Richey, FL (US); Amanda Lewis, Daphne, AL (US)

(73) Assignee: KnowBe4, Inc.

( * ) Notice: Subject to any disclaimer, the term of this patent is extended or adjusted under 35 U.S.C. 154(b) by 0 days.

(21) Appl. No.: 17/529,200

(22) Filed: Nov. 17, 2021

(65) Prior Publication Data

US 2022/0166784 A1  May 26, 2022

Related U.S. Application Data

(60) Provisional application No. 63/117,654, filed on Nov. 24, 2020.

(51) Int. Cl.
*H04L 9/40* (2022.01)
*G06F 16/2455* (2019.01)
*H04L 51/212* (2022.01)

(52) U.S. Cl.
CPC ...... *H04L 63/1416* (2013.01); *G06F 16/2455* (2019.01); *H04L 51/212* (2022.05); *H04L 63/1425* (2013.01)

(58) Field of Classification Search
CPC . H04L 63/1416; H04L 51/12; H04L 63/1425; H04L 51/212; G06F 16/2455
See application file for complete search history.

(56) References Cited

U.S. PATENT DOCUMENTS

| | | |
|---|---|---|
| 8,615,807 B1 | 12/2013 | Higbee et al. |
| 8,635,703 B1 | 1/2014 | Belani et al. |
| 8,719,940 B1 | 5/2014 | Higbee et al. |
| 8,910,287 B1 | 12/2014 | Belani et al. |
| 8,966,637 B2 | 2/2015 | Belani et al. |
| 9,053,326 B2 | 6/2015 | Higbee et al. |
| 9,246,936 B1 | 1/2016 | Belani et al. |
| 9,253,207 B2 | 2/2016 | Higbee et al. |

(Continued)

FOREIGN PATENT DOCUMENTS

| | | |
|---|---|---|
| EP | 3 582 468 A1 | 12/2019 |
| WO | WO-2016/164844 A1 | 10/2016 |

*Primary Examiner* — Piotr Poltorak
*Assistant Examiner* — Suman Debnath
(74) *Attorney, Agent, or Firm* — Foley & Lardner LLP

(57) ABSTRACT

Systems and methods are described for identifying other instances of messages corresponding to a reported malicious message. A report of a malicious message from a user of a plurality users using a messaging system is received. Responsive to the report of the malicious message, plain text of content selected from the malicious message is provided. Thereafter, one or more segments of the plain text are selected as key content for construction of a search. A search is then executed in the messaging system for one or more other malicious messages corresponding to the reported malicious message using the selected one or more segments of the plain text with one or more match criteria or no criteria. The one or more other malicious messages corresponding to the reported malicious message are identified in the messaging system.

20 Claims, 7 Drawing Sheets

(56) References Cited

U.S. PATENT DOCUMENTS

| | | |
|---|---|---|
| 9,262,629 B2 | 2/2016 | Belani et al. |
| 9,325,730 B2 | 4/2016 | Higbee et al. |
| 9,356,948 B2 | 5/2016 | Higbee et al. |
| 9,398,038 B2 | 7/2016 | Higbee et al. |
| 9,591,017 B1 | 3/2017 | Higbee et al. |
| 9,667,645 B1 | 5/2017 | Belani et al. |
| 9,876,753 B1 | 1/2018 | Hawthorn |
| 9,912,687 B1 | 3/2018 | Wescoe et al. |
| 10,243,904 B1 | 3/2019 | Wescoe et al. |
| 10,904,186 B1 | 1/2021 | Everton et al. |
| 10,986,122 B2 | 4/2021 | Bloxham et al. |
| 11,044,267 B2 | 6/2021 | Jakobsson et al. |
| 11,184,393 B1 | 11/2021 | Gendre et al. |
| 11,297,094 B2 | 4/2022 | Huda |
| 11,392,691 B1* | 7/2022 | Wright ................. H04L 63/145 |
| 2003/0120947 A1* | 6/2003 | Moore ................. G06F 21/563 726/22 |
| 2009/0182818 A1* | 7/2009 | Krywaniuk ........... H04L 51/212 709/206 |
| 2016/0142429 A1* | 5/2016 | Renteria ............. H04L 63/1416 726/23 |
| 2016/0164898 A1 | 6/2016 | Belani et al. |
| 2016/0301705 A1 | 10/2016 | Higbee et al. |
| 2018/0091528 A1* | 3/2018 | Shahbaz ................. G06F 21/53 |
| 2018/0205753 A1* | 7/2018 | Raz ........................ G06F 21/566 |
| 2019/0173819 A1 | 6/2019 | Wescoe et al. |
| 2019/0215335 A1 | 7/2019 | Benishti |
| 2019/0245885 A1 | 8/2019 | Starink et al. |
| 2020/0195694 A1* | 6/2020 | Kalinin ............... H04L 63/1416 |
| 2020/0311260 A1 | 10/2020 | Klonowski et al. |
| 2021/0021612 A1* | 1/2021 | Higbee ................... H04L 51/12 |
| 2021/0036867 A1* | 2/2021 | Attard ..................... G06F 21/64 |
| 2021/0136107 A1* | 5/2021 | Black .................... H04L 63/123 |
| 2021/0185075 A1 | 6/2021 | Adams |
| 2021/0194924 A1 | 6/2021 | Heinemeyer et al. |
| 2021/0407308 A1 | 12/2021 | Brubaker et al. |
| 2022/0005373 A1 | 1/2022 | Nelson et al. |
| 2022/0006830 A1 | 1/2022 | Wescoe |
| 2022/0078207 A1 | 3/2022 | Chang et al. |
| 2022/0094702 A1 | 3/2022 | Saad Ahmed et al. |
| 2022/0100332 A1 | 3/2022 | Haworth et al. |
| 2022/0116419 A1 | 4/2022 | Kelm et al. |
| 2022/0130274 A1 | 4/2022 | Krishna Raju et al. |
| 2022/0286419 A1 | 9/2022 | Stetzer et al. |

* cited by examiner

Find Similar Messages

Match Criteria ── 302

☐ Subject:
☐ Sender:
☐ Recipients:
☐ Attachments ──── 308
☐ Body

To all employees,

We have just finished installing a new email system. We want to ensure that all employees are receiving emails correctly. All we ask is that you click here, confirming that you received this email.

Time Frame [Last 24 hours ▶] ── 304

☐ Quarantine All ── 306

[Cancel] [Search]

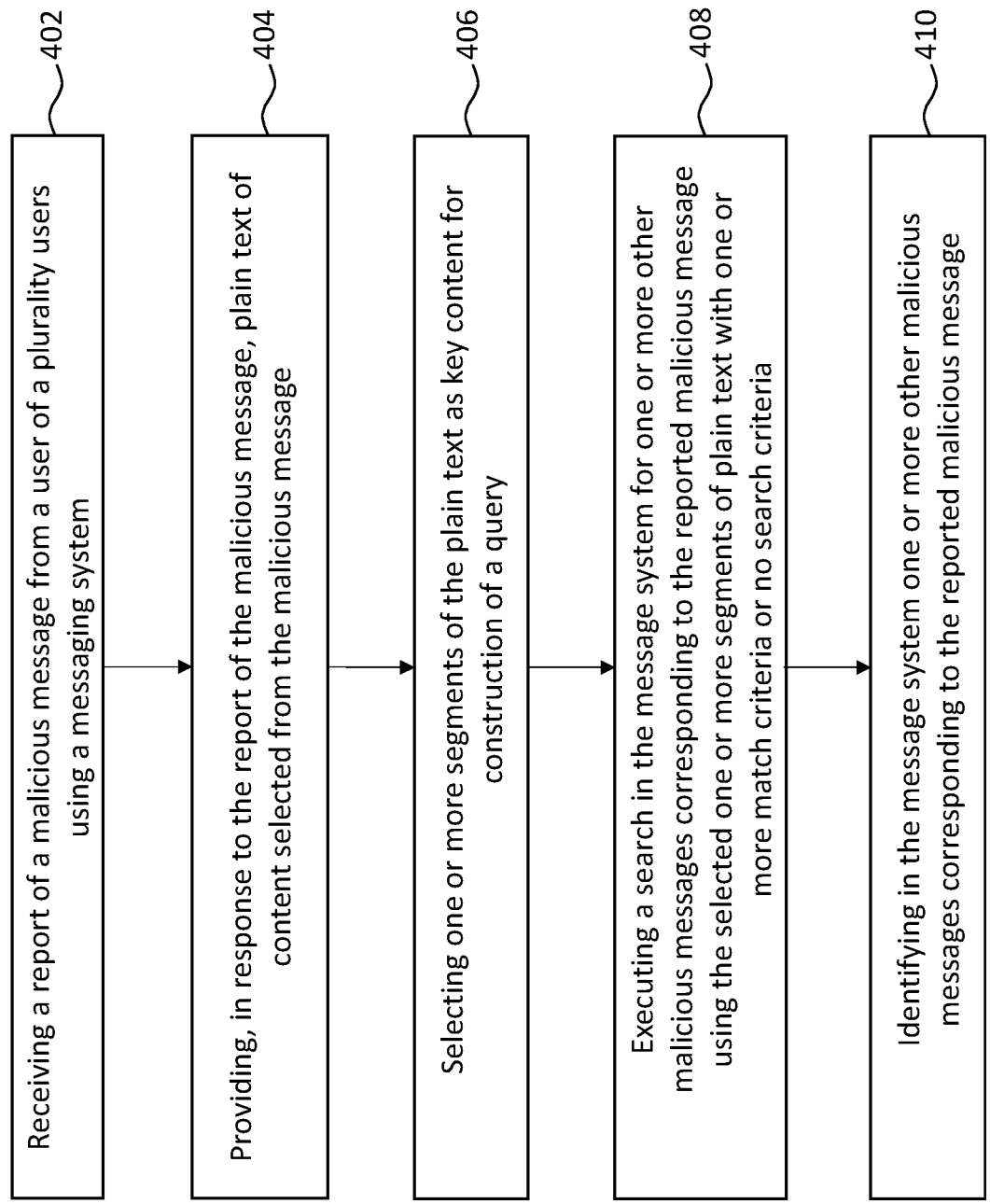

SYSTEMS AND METHODS IDENTIFYING MALICIOUS COMMUNICATIONS IN MULTIPLE MESSAGE STORES

RELATED APPLICATIONS

This patent application claims the benefit of and priority to U.S. Provisional Patent Application No. 63/117,654 titled "SYSTEMS AND METHODS IDENTIFYING MALICIOUS COMMUNICATIONS IN MULTIPLE MESSAGE STORES," and filed Nov. 24, 2020, the contents of all of which are hereby incorporated herein by reference in its entirety for all purposes

TECHNICAL FIELD

The present disclosure relates to systems and methods for the effective identification of malicious communications in the message stores of multiple users.

BACKGROUND

Among the cybersecurity attacks, organizations have recognized phishing attacks as one of the most prominent threats that can cause serious breaches of data including confidential information such as intellectual property, financial information, organizational information and other important information. Attackers who launch phishing attacks may attempt to evade an organization's security apparatuses and tools and target its employees. To prevent or to reduce the success rate of phishing attacks on employees, the organizations may conduct security awareness training programs for their employees, along with other security measures. Through security awareness training programs, the organizations actively educate their employees on how to spot and report a suspected phishing attack.

As a part of a security awareness training program, an organization may execute a simulated phishing campaign for its employees, to test and develop cybersecurity awareness of the employees. In an example, the organization may execute the simulated phishing campaign by sending out one or more simulated phishing messages periodically or occasionally to devices of employees and observing responses of employees to such simulated phishing messages. A simulated phishing message may mimic a real phishing communication and appear genuine to entice an employee to respond/interact with the simulated phishing message. The simulated phishing message may serve the purpose of training an employee to recognize phishing attacks and to gauge the security awareness of the employee based on an interaction of the employee with the simulated phishing message (for example, by clicking on a link in the simulated phishing messages or opening an attachment in the simulated phishing message) for further security awareness training.

In some cases, employees of the organization may be provided with various reporting tools to support the employees to report a suspected message (potentially malicious phishing message). A Phishing Alert Button (PAB) plug-in is one example of such a tool which may be provided to employees as a part of an email client to report the suspected message. The reported message may then be forwarded to a system administrator, such as a security authority, or to the Information Technology (IT) department for triage or quarantine and further analysis to enable the identification of potential phishing threats and malicious actors. In some examples, the employees may forward the suspected message to a specified address or a security contact point provided by the IT department.

SUMMARY

The present disclosures generally relates to systems and methods for the effective identification of malicious communications in the message stores of multiple users.

Systems and methods are provided for identifying instances of messages corresponding to a reported malicious message. In an example embodiment, a method for identifying instances of messages corresponding to a reported malicious message is described, which includes receiving a report of a malicious message from a user of a plurality users using a messaging system, providing plain text of content selected from the malicious message, selecting one or more segments of the plain text as key content for construction of a search, executing a search in the messaging system for one or more other malicious messages corresponding to the reported malicious message using the selected one or more segments of the plain text with one or more match criteria, and identifying, in the messaging system, the one or more other malicious messages corresponding to the reported malicious message.

In some implementations, the method includes selecting content from the malicious message.

In some implementations, the method includes parsing the plain text from the content using a parser to parse out the plain text from content corresponding to authoring language used to create the content.

In some implementations, the method includes generating a recommendation of one or more segments of plain text as key content.

In some implementations, the method includes identifying the one or more match criteria for matching the selected one or more segments to one or more messages.

In some implementations, the method includes constructing the search based at least on the one or more segments of the plain text and the one or more match criteria.

In some implementations, the method includes constructing a query of the search to be formatted into a single query that searches portions or all of the body of one or more messages for a collection of the one or more segments of the plain text matching the one or more match criteria.

In some implementations, the method includes validating the search based on a measure of success in identifying the one or more other malicious messages corresponding to the reported malicious message and quarantining the one or more other malicious messages identified from the search.

In some implementations, the method includes monitoring the one or more other malicious messages identified by the search to determine a number of false positives arising from the search.

In another example implementation, a system for identifying instances of messages corresponding to of a reported malicious message is described. The system receives a report of a malicious message from a user of a plurality users using a messaging system, provides plain text of content selected from the malicious message, selects one or more segments of the plain text as key content for construction of a search, executes a search in the messaging system for one or more other malicious messages corresponding to the reported malicious message using the selected one or more segments of the plain text with one or more match criteria, and identifies in the messaging system the one or more other malicious messages corresponding to the reported malicious message.

Other aspects and advantages of the present disclosure will become apparent from the following detailed description, taken in conjunction with the accompanying drawings, which illustrate by way of example the principles of the present disclosure.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 3 depicts an exemplary graphical user interface provided to a system administrator for searching the one or more malicious messages in the messaging system, according to some embodiments; and FIG. 4 depicts a process flow for identifying one or more malicious messages in the messaging system corresponding to the reported malicious message, according to some embodiments.

DETAILED DESCRIPTION

For the purposes of reading the description of the various embodiments below, the following descriptions of the sections of the specifications and their respective contents may be helpful:

Section A describes a network environment and computing environment which may be useful for practicing embodiments described herein.

Section B describes embodiments of systems and methods for the effective identification of malicious communications in the message stores of multiple users.

A. Computing and Network Environment

Figure 1A:
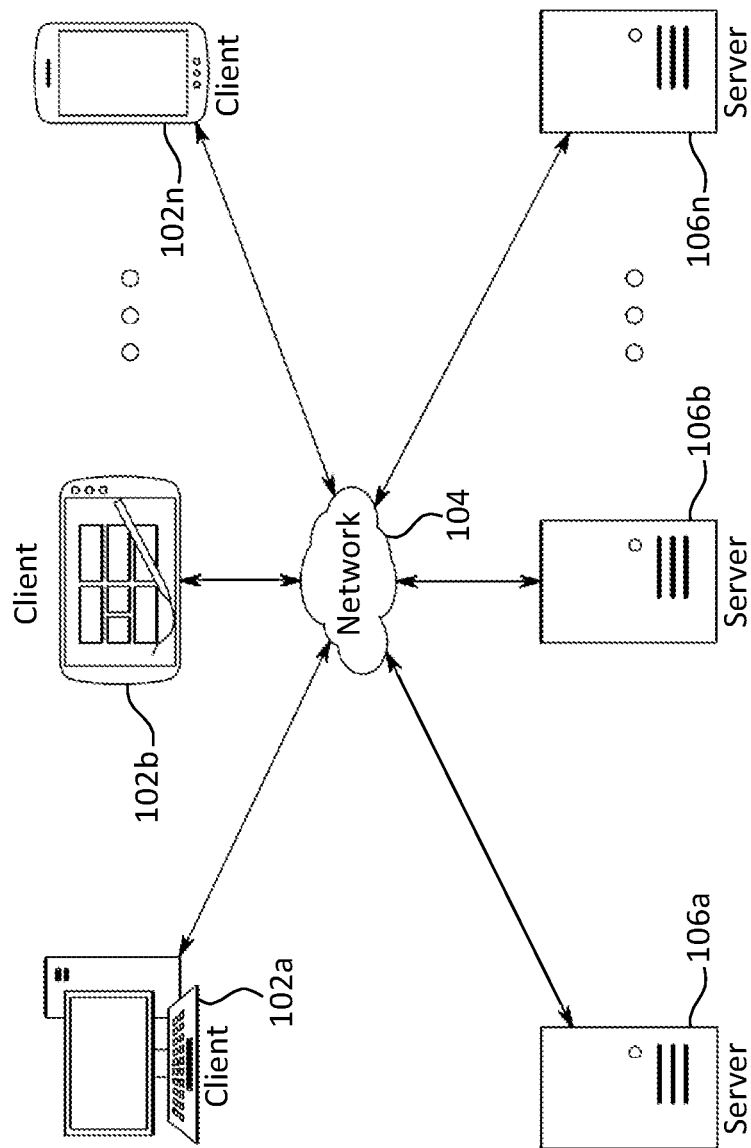
FIG. 1A is a block diagram depicting an embodiment of a network environment comprising client devices in communication with server devices, according to some embodiments.

Prior to discussing specific embodiments of the present solution, it may be helpful to describe aspects of the operating environment as well as associated system components (e.g. hardware elements) in connection with the methods and systems described herein. Referring to FIG. 1A, an embodiment of a network environment is depicted. In a brief overview, the network environment includes one or more clients 102a-102n (also generally referred to as local machines(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node(s) 106, machine(s) 106, or remote machine(s) 106) via one or more networks 104. In some embodiments, client 102 has the capacity to function as both a client node seeking access to resources provided by a server and as a server providing access to hosted resources for other clients 102a-102n.

Although FIG. 1A shows a network 104 between clients 102 and the servers 106, clients 102 and servers 106 may be on the same network 104. In some embodiments, there are multiple networks 104 between clients 102 and servers 106. In one of these embodiments, network 104' (not shown) may be a private network and a network 104 may be a public network. In another of these embodiments, network 104 may be a private network and a network 104' may be a public network. In still another of these embodiments, networks 104 and 104' may both be private networks.

Network 104 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel or a satellite band. The wireless links may also include any cellular network standards to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommuniations-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1×RTT, CDMA-EVDO, LTE, LTE-Advanced, LTE-M1, and Narrowband IoT (NB-IoT). Wireless standards may use various channel access methods, e.g. FDMA, TDMA, CDMA, or SDMA. In some embodiments, different types of data may be transmitted via different links and standards. In other embodiments, the same types of data may be transmitted via different links and standards.

Network 104 may be any type and/or form of network. The geographical scope of the network may vary widely and network 104 can be a body area network (BAN), a personal area network (PAN), a local-area network (LAN), e.g. Intranet, a metropolitan area network (MAN), a wide area network (WAN), or the Internet. The topology of network 104 may be of any form and may include, e.g., any of the following: point-to-point, bus, star, ring, mesh, or tree. Network 104 may be an overlay network which is virtual and sits on top of one or more layers of other networks 104'. Network 104 may be of any such network topology as known to those ordinarily skilled in the art capable of supporting the operations described herein. Network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv6), or the link layer. Network 104 may be a type of broadcast network, a telecommunications network, a data communication network, or a computer network.

In some embodiments, the system may include multiple, logically grouped servers 106. In one of these embodiments, the logical group of servers may be referred to as a server farm or a machine farm. In another of these embodiments, servers 106 may be geographically dispersed. In other embodiments, a machine farm may be administered as a single entity. In still other embodiments, the machine farm includes a plurality of machine farms. Servers 106 within each machine farm can be heterogeneous—one or more of servers 106 or machines 106 can operate according to one type of operating system platform (e.g., Windows, manufactured by Microsoft Corp. of Redmond, Washington), while one or more of the other servers 106 can operate according to another type of operating system platform (e.g., Unix, Linux, or Mac OSX).

In one embodiment, servers 106 in the machine farm may be stored in high-density rack systems, along with associated storage systems, and located in an enterprise data center. In the embodiment, consolidating servers 106 in this way may improve system manageability, data security, the physical security of the system, and system performance by locating servers 106 and high-performance storage systems on localized high-performance networks. Centralizing servers 106 and storage systems and coupling them with advanced system management tools allows more efficient use of server resources.

Servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 106 in the machine farm can be increased if servers 106 are connected using a local-area network (LAN) connection or some form of direct connection. Additionally, a heterogeneous machine farm may include one or more servers 106 operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc. of Fort Lauderdale, Florida; the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, California Additional layers of abstraction may include Container Virtualization and Management infrastructure. Container Virtualization isolates execution of a service to the container while relaying instructions to the machine through one operating system layer per host machine. Container infrastructure may include Docker, an open source product whose development is overseen by Docker, Inc. of San Francisco, California.

Management of the machine farm may be de-centralized. For example, one or more servers 106 may comprise components, subsystems and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, a plurality of servers 106 may be in the path between any two communicating servers 106.

Figure 1B:
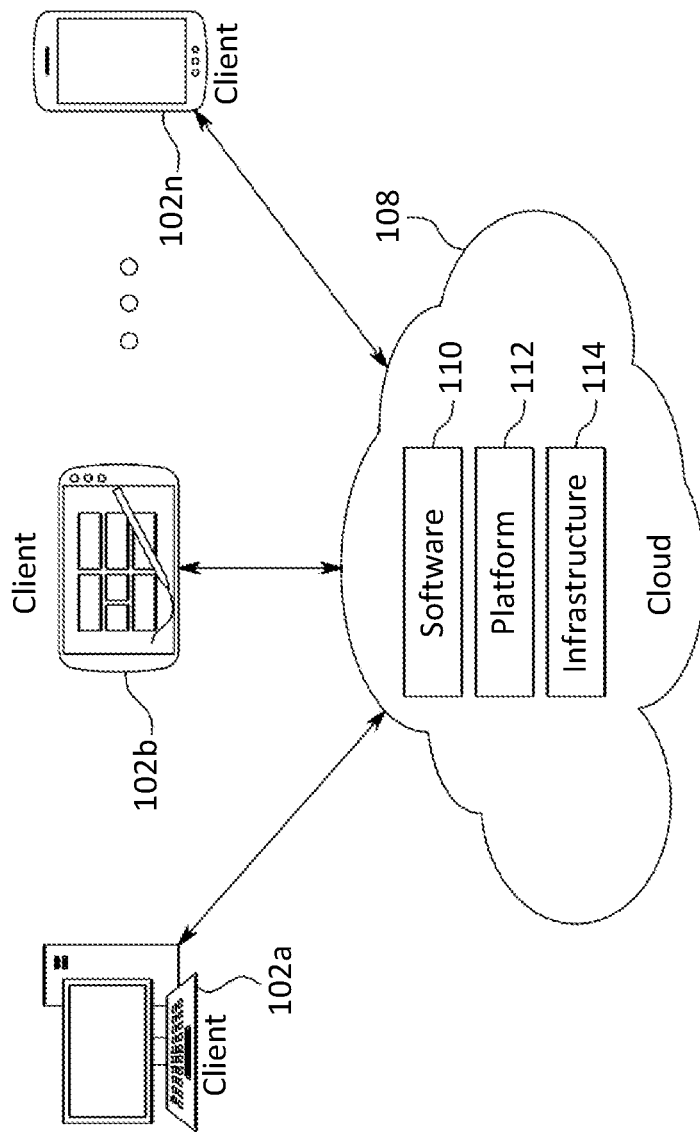
FIG. 1B is a block diagram depicting a cloud computing environment comprising client devices in communication with cloud service providers, according to some embodiments.

Referring to FIG. 1B, a cloud computing environment is depicted. A cloud computing environment may provide client 102 with one or more resources provided by a network environment. The cloud computing environment may include one or more clients 102a-102n, in communication with cloud 108 over one or more networks 104. Clients 102 may include, e.g., thick clients, thin clients, and zero clients. A thick client may provide at least some functionality even when disconnected from cloud 108 or servers 106. A thin client or zero client may depend on the connection to cloud 108 or server 106 to provide functionality. A zero client may depend on cloud 108 or other networks 104 or servers 106 to retrieve operating system data for the client device 102. Cloud 108 may include back end platforms, e.g., servers 106, storage, server farms or data centers.

Cloud 108 may be public, private, or hybrid. Public clouds may include public servers 106 that are maintained by third parties to clients 102 or the owners of the clients. Servers 106 may be located off-site in remote geographical locations as disclosed above or otherwise. Public clouds may be connected to servers 106 over a public network. Private clouds may include private servers 106 that are physically maintained by clients 102 or owners of clients. Private clouds may be connected to servers 106 over a private network 104. Hybrid clouds 109 may include both the private and public networks 104 and servers 106.

Cloud 108 may also include a cloud-based delivery, e.g. Software as a Service (SaaS) 110, Platform as a Service (PaaS) 112, and Infrastructure as a Service (IaaS) 114. IaaS may refer to a user renting the user of infrastructure resources that are needed during a specified time period. IaaS provides may offer storage, networking, servers or virtualization resources from large pools, allowing the users to quickly scale up by accessing more resources as needed. Examples of IaaS include Amazon Web Services (AWS) provided by Amazon, Inc. of Seattle, Washington, Rackspace Cloud provided by Rackspace Inc. of San Antonio, Texas, Google Compute Engine provided by Google Inc. of Mountain View, California, or RightScale provided by RightScale, Inc. of Santa Barbara, California PaaS providers may offer functionality provided by IaaS, including, e.g., storage, networking, servers, virtualization or containerization, as well as additional resources, e.g., the operating system, middleware, or runtime resources. Examples of PaaS include Windows Azure provided by Microsoft Corporation of Redmond, Washington, Google App Engine provided by Google Inc., and Heroku provided by Heroku, Inc. of San Francisco California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, California, or Office365 provided by Microsoft Corporation. Examples of SaaS may also include storage providers, e.g. Dropbox provided by Dropbox Inc. of San Francisco, California, Microsoft OneDrive provided by Microsoft Corporation, Google Drive provided by Google Inc., or Apple iCloud provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over a Hypertext Transfer Protocol (HTTP) and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources using web-based user interfaces, provided by a web browser (e.g. Google Chrome, Microsoft Internet Explorer, or Mozilla Firefox provided by Mozilla Foundation of Mountain View, California). Clients 102 may also access SaaS resources through smartphone or tablet applications, including e.g., Salesforce Sales Cloud, or Google Drive App. Clients 102 may also access SaaS resources through the client operating system, including e.g. Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Client 102 and server 106 may be deployed as and/or executed on any type and form of computing device, e.g., a computer, network device or appliance capable of communicating on any type and form of network and performing the operations described herein.

Figure 1C:
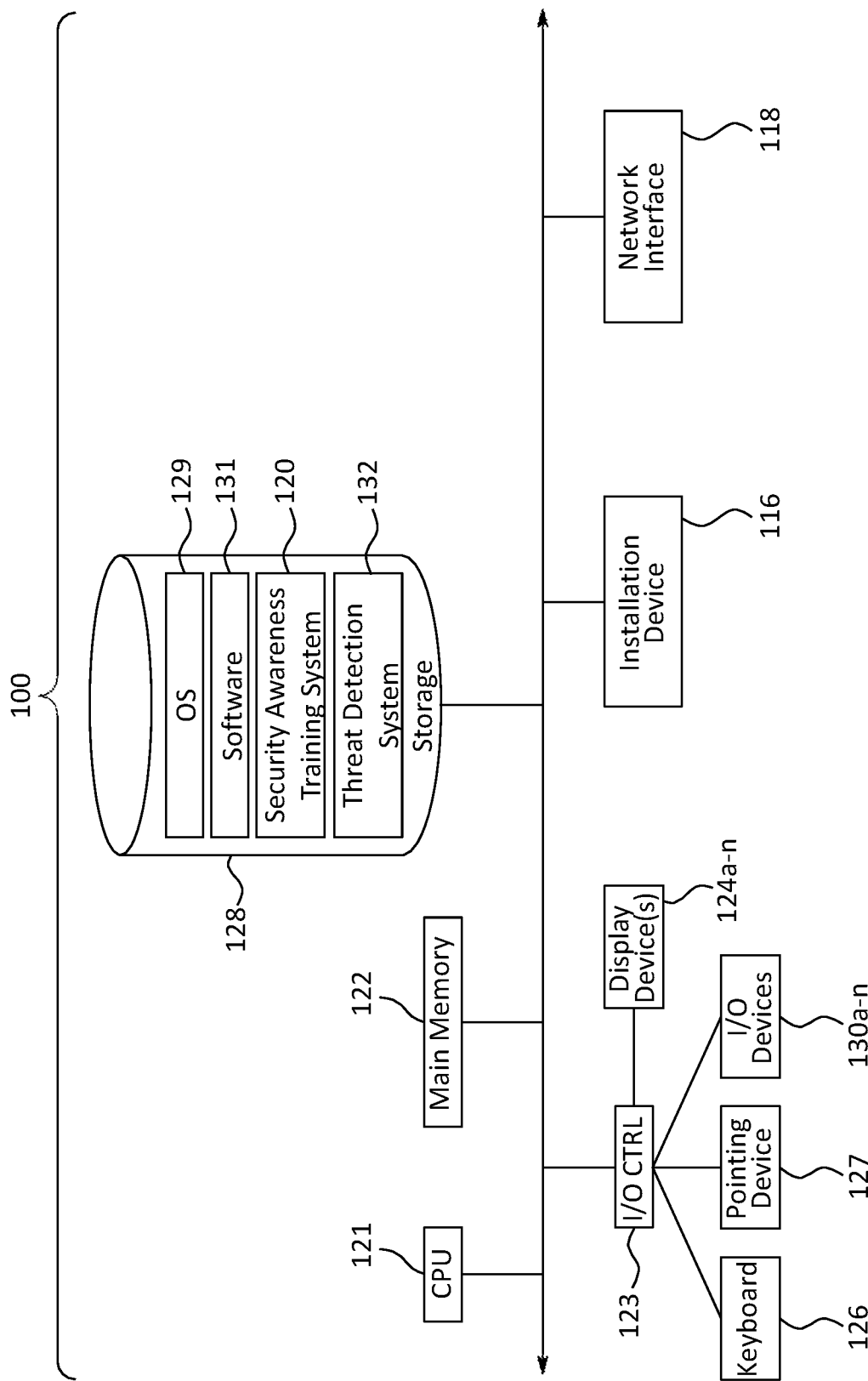
FIGS. 1C and 1D are block diagrams depicting embodiments of computing devices useful in connection with the methods and systems described herein, according to some embodiments.
Figure 1D:
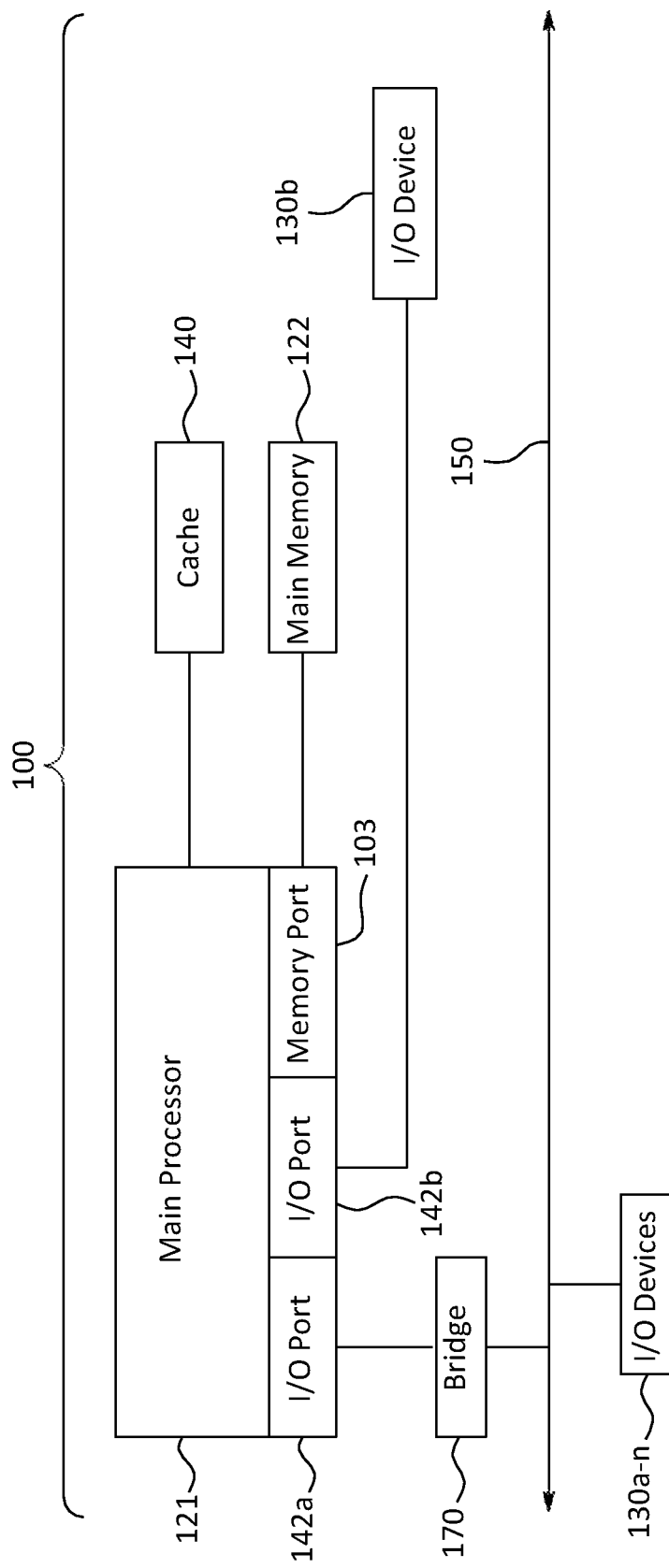

FIGS. 1C and 1D depict block diagrams of a computing device 100 useful for practicing an embodiment of client 102 or server 106. As shown in FIGS. 1C and 1D, each computing device 100 includes central processing unit 121, and main memory unit 122. As shown in FIG. 1C, computing device 100 may include storage device 128, installation device 116, network interface 118, and I/O controller 123, display devices 124a-124n, keyboard 126 and pointing device 127, e.g., a mouse. Storage device 128 may include, without limitation, operating system 129, software 131, a software of security awareness training system 120 and a software of threat detection system 132. As shown in FIG. 1D, each computing device 100 may also include additional optional elements, e.g., a memory port 103, bridge 170, one or more input/output devices 130a-130n (generally referred to using reference numeral 130), and cache memory 140 in communication with central processing unit 121.

Central processing unit 121 is any logic circuitry that responds to and processes instructions fetched from main memory unit 122. In many embodiments, central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. Computing device 100 may be based on any of these processors, or any other processor capable of operating as described herein. Central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include one or more memory chips capable of storing data and allowing any storage location to be directly accessed by microprocessor 121. Main memory unit 122 may be volatile and faster than storage 128 memory. Main memory units 122 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, main memory 122 or storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. Main memory 122 may be based on any of the above described memory chips, or any other available memory chips capable of operating as described herein. In the embodiment shown in FIG. 1C, the processor 121 communicates with main memory 122 via system bus 150 (described in more detail below). FIG. 1D depicts an embodiment of computing device 100 in which the processor communicates directly with main memory 122 via memory port 103. For example, in FIG. 1D main memory 122 may be DRDRAM.

FIG. 1D depicts an embodiment in which the main processor 121 communicates directly with cache memory 140 via a secondary bus, sometimes referred to as a backside bus. In other embodiments, main processor 121 communicates with cache memory 140 using system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via local system bus 150. Various buses may be used to connect central processing unit 121 to any of I/O devices 130, including a PCI bus, a PCI-X bus, or a PCI-Express bus, or a NuBus. For embodiments in which the I/O device is video display 124, the processor 121 may use an Advanced Graphic Port (AGP) to communicate with display 124 or the I/O controller 123 for display 124. FIG. 1D depicts an embodiment of computer 100 in which main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple iPhone. Some devices 130a-130n allow gesture recognition inputs through combining some of the inputs and outputs. Some devices 130a-130n provide for facial recognition which may be utilized as an input for different purposes including authentication and other commands. Some devices 130a-130n provide for voice recognition and inputs, including, e.g., Microsoft KINECT, SIRI for iPhone by Apple, Google Now or Google Voice Search, and Alexa by Amazon.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augmented reality devices. The I/O devices may be controlled by I/O controller 123 as shown in FIG. 1C. The I/O controller may control one or more I/O devices, such as, e.g., keyboard 126 and pointing device 127, e.g., a mouse or optical pen. Furthermore, an I/O device may also provide storage and/or installation medium 116 for computing device 100. In still other embodiments, computing device 100 may provide USB connections (not shown) to receive handheld USB storage devices. In further embodiments, a I/O device 130 may be a bridge between the system bus 150 and an external communication bus, e.g. a USB bus, a SCSI bus, a FireWire bus, an Ethernet bus, a Gigabit Ethernet bus, a Fiber Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or auto stereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, computing device 100 may include or connect to multiple display devices 124a-124n, which each may be of the same or different type and/or form. As such, any of I/O devices 130a-130n and/or the I/O controller 123 may include any type and/or form of suitable hardware, software, or combination of hardware and software to support, enable or provide for the connection and use of multiple display devices 124a-124n by computing device 100. For example, computing device 100 may include any type and/or form of video adapter, video card, driver, and/or library to interface, communicate, connect or otherwise use display devices 124a-124n. In one embodiment, a video adapter may include multiple connectors to interface to multiple display devices 124a-124n. In other embodiments, computing device 100 may include multiple video adapters, with each video adapter connected to one or more of display devices 124a-124n. In some embodiments, any portion of the operating system of computing device 100 may be configured for using multiple displays 124a-124n. In other embodiments, one or more of the display devices 124a-124n may be provided by one or more other computing devices 100a or 100b connected to computing device 100, via network 104. In some embodiments, software may be designed and constructed to use another computer's display device as second display device 124a for computing device 100. For example, in one embodiment, an Apple iPad may connect to computing device 100 and use the display of the device 100 as an additional display screen that may be used as an extended desktop. One ordinarily skilled in the art will recognize and appreciate the various ways and embodiments that computing device 100 may be configured to have multiple display devices 124a-124n.

Referring again to FIG. 1C, computing device 100 may comprise storage device 128 (e.g. one or more hard disk drives or redundant arrays of independent disks) for storing an operating system or other related software, and for storing application software programs such as any program related to security awareness training system 120 and threat detection system 132. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to computing device 100 via bus 150. Some storage device 128 may be external and connect to computing device 100 via a I/O device 130 that provides an external bus. Some storage device 128 may connect to computing device 100 via network interface 118 over network 104, including, e.g., the Remote Disk for MACBOOK AIR by Apple. Some client devices 100 may not require a non-volatile storage device 128 and may be thin clients or zero clients 102. Some storage device 128 may also be used as an installation device 116 and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Computing device 100 (e.g., client device 102) may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on client device 102. An application distribution platform may include a repository of applications on server 106 or cloud 108, which clients 102a-102n may access over a network 104. An application distribution platform may include application developed and provided by various developers. A user of client device 102 may select, purchase and/or download an application via the application distribution platform.

Furthermore, computing device 100 may include a network interface 118 to interface to network 104 through a variety of connections including, but not limited to, standard telephone lines LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX and direct asynchronous connections). In one embodiment, computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. Network interface 118 may comprise a built-in network adapter, network interface card, PCMCIA network card, EXPRESSCARD network card, card bus network adapter, wireless network adapter, USB network adapter, modem or any other device suitable for interfacing computing device 100 to any type of network capable of communication and performing the operations described herein.

Computing device 100 of the sort depicted in FIGS. 1B and 1C may operate under the control of an operating system, which controls scheduling of tasks and access to system resources. Computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, WINDOWS 8 and WINDOW 10, all of which are manufactured by Microsoft Corporation of Redmond, Washington; MAC OS and iOS, manufactured by Apple, Inc.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

Computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. Computer system 100 has sufficient processor power and memory capacity to perform the operations described herein. In some embodiments, computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, computing device 100 is a gaming system. For example, the computer system 100 may comprise a PLAYSTATION 3, or PERSONAL PLAYSTATION PORTABLE (PSP), PLAYSTATION VITA, PLAYSTATION 4, or a PLAYSTATION 4 PRO device manufactured by the Sony Corporation of Tokyo, Japan, or a NINTENDO DS, NINTENDO 3DS, NINTENDO WII, NINTENDO WII U, or a NINTENDO SWITCH device manufactured by Nintendo Co., Ltd., of Kyoto, Japan, or an XBOX 360 device manufactured by Microsoft Corporation.

In some embodiments, computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, computing device 100 is a tablet e.g. the IPAD line of devices by Apple; GALAXY TAB family of devices by Samsung; or KINDLE FIRE, byAmazon.com, Inc. of Seattle, Washington. In other embodiments, computing device 100 is an eBook reader, e.g. the KINDLE family of devices by Amazon.com, or NOOK family of devices by Barnes & Noble, Inc. of New York City, New York.

In some embodiments, communications device 102 includes a combination of devices, e.g. a smartphone combined with a digital audio player or portable media player. For example, one of these embodiments is a smartphone, e.g. the iPhone family of smartphones manufactured by Apple, Inc.; a Samsung GALAXY family of smartphones manufactured by Samsung, Inc; or a Motorola DROID family of smartphones. In yet another embodiment, communications device 102 is a laptop or desktop computer equipped with a web browser and a microphone and speaker system, e.g. a telephony headset. In these embodiments, communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, the information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods Identifying Malicious Communications in Multiple Message Stores The following describes systems and methods for effective identification of malicious communications in message stores of multiple users.

The systems and methods of the present disclosure leverage a threat detection system and a security awareness training system to identify malicious messages in the message stores (which may also be referred to as mailboxes) of multiple users. A user may be an employee of an organization, a member of a group, a vendor, a client, a customer or any individual that can receive an electronic message, or who may act in any capacity of a security awareness training system. In an implementation, a user may report a suspected message (a potentially malicious phishing message). In response to reporting, the security awareness training system may determine whether a reported message is a simulated phishing or not. Responsive to determining that the reported message is not a simulated phishing message, the security awareness training system may forward the message to a threat detection system. The threat detection system may confirm on whether the message is malicious or not. If the reported message is found to be malicious then a system administrator, other appropriate personnel, the threat detection system and/or any other IT system within the organization may want to identify if there are one or more other malicious messages corresponding to the reported malicious message sent to other users in the organization. In one example, the reported message may not have been identified initially as a malicious message by an anti-phish scan. The system administrator may want to remove these one or more other malicious messages corresponding to the reported malicious message from mailboxes of other employees in which they are found before the other users interact with the one or more other malicious messages corresponding to the reported malicious message leading to a possible potential information security breach.

In order to quickly and accurately identify the one or more other malicious messages corresponding to the reported malicious message within the organization and to remove these from users' mailboxes, the system administrator, other appropriate personnel, the threat detection system and/or any other IT system within the organization may have to search the mailboxes of all employees or messaging system in the organization. However, malicious phishing messages may typically include a number of variations, for example, from recipient to recipient. The variations may include variation in recipient name, variation in sender name, variation in addressing the recipient, variation in content in body of the message, variation in content in the attachment and other variations. The variations may hamper the search for one or more other malicious messages corresponding to the reported malicious message using exact content of the reported malicious message. Therefore, if the system administrator and/or the threat detection system searches the messaging system using content that is exactly in the reported malicious message, then the system administrator, other appropriate personnel, the threat detection system and/or any other IT system within the organization may miss one or more other malicious messages corresponding to the reported malicious message. In examples, if the search is too broad, as would be the case for example if the search terms comprised a few keywords from the reported malicious message and the search is based on those keywords, then the search may likely capture and remove many messages that are not malicious. The messages that are not malicious may be important messages that the users may be required to read or take appropriate actions on. Thus, an overly broad search may negatively impact efficient operation of the organization.

The system administrator and/or the threat detection system may perform a search based on, for example, recipient addresses, sender addresses, reply to addresses, portions or all of the body of a message, attachments to the message or any other part of the message. However, there are specific challenges when attempting to search the body of a message as content in the body of a message is commonly encoded in Hypertext Markup Language (HTML), Cascading Style Sheets (CS S) or such formats. For example, if the content of the body of the message is encoded in HTML or CSS, then a search for a specific text string may not be successful. In an example, a sentence in body of a message "This is a test message" where the word 'test' has been italicized indicates that the character string within the body of the message will read "This is a <i>test</i> message" in the HTML format. Accordingly, a search for messages including the text string "This is a test message" would fail. Thus, presence of HTML tags or style sheets in the content in the body of a message makes a query that searches the content in the body of the message unreliable.

In accordance with various embodiments of present disclosure, threat detection system provides a phishing message search engine to search and quarantine malicious message(s). Phishing message search engine may provide capabilities to search for one or more other malicious messages corresponding to the reported malicious message manually, using recommendation-based search and using fully automatic search. In response to receiving a report of malicious messages, the threat detection system and/or a system administrator may confirm and validate that the reported malicious message is indeed malicious. Responsive to the confirmation, threat detection system or the system administrator may remove malicious content from the reported message. Threat detection system may initiate a phishing message search engine to search for one or more other malicious messages corresponding to the reported malicious message. The system administrator may choose the manual search, the recommendation-based search or the fully automatic search to execute search and obtain one or more messages from messaging system corresponding to the reported malicious message. In some embodiments, threat detection system may execute the fully automatic search through a phishing message search engine without any initiation from the system administrator. In response to the execution of search, a phishing message search engine may provide a search result including one or more messages from a messaging system. A threat detection system or the system administrator may analyze the search result to validate a search query and/or key content in the search query based at least on a measure of success in identifying one or more other malicious messages corresponding to the reported malicious message and not identifying messages that are not malicious messages in the search result based on the query defined based on the key content of the reported malicious message. Through the validation, the threat detection system may also assess how many false positive messages are returned by the search and may modify key content of the query or the query itself to reduce the false positive messages and/or to increase number of other malicious messages corresponding to the reported malicious message. Therefore, the threat detection system may identify and remove as many genuine malicious messages as possible, while minimizing the number of false positive messages, that is benign messages, that match the search query and/or do not correspond to the reported malicious message.

Figure 2:
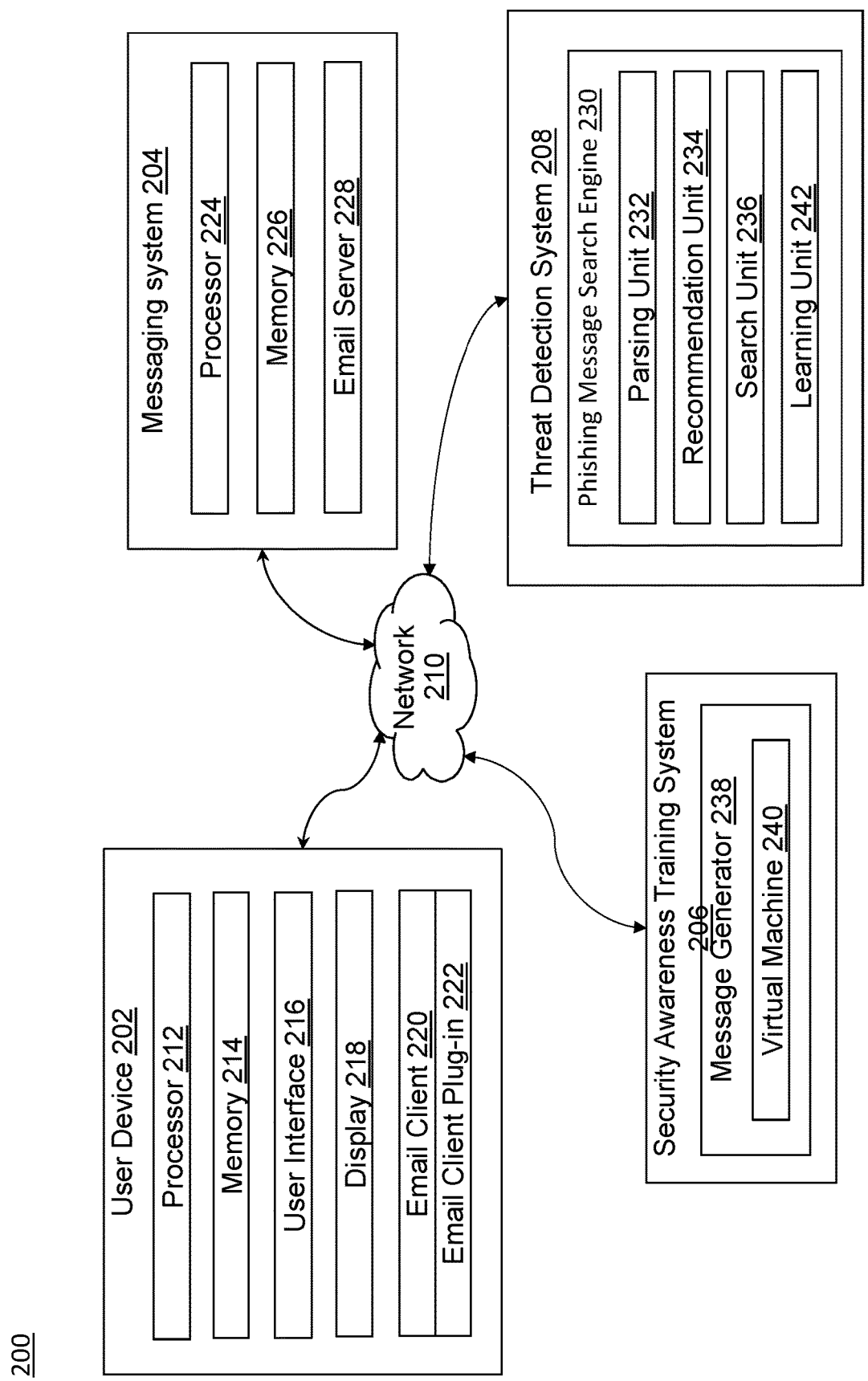
FIG. 2 depicts an implementation of some of an architecture of an implementation of a system for identifying one or more malicious messages in a messaging system corresponding to a reported malicious message, according to some embodiments.

FIG. 2 depicts an implementation of some of an architecture of an implementation of system 200 for identifying one or more malicious messages in a messaging system corresponding to a reported malicious message, according to some embodiments.

System 200 may include user device 202, messaging system 204, security awareness training system 206, threat detection system 208, and network 210 enabling communication between the system components for information exchange. Network 210 may be an example or instance of network 104, details of which are provided with reference to FIG. 1A and its accompanying description.

Referring again to FIG. 2, in some embodiments, user device 202 may be any device used by a user for organization purposes. The user may be an employee of an organization, a client, a vendor, customer, a contractor or any person associated with the organization. User device 202 as disclosed, may be any computing device, such as a desktop computer, a laptop, a tablet computer, a mobile device, a Personal Digital Assistant (PDA) or any other computing device. In an implementation, user device 202 may be a device, such as client device 102 shown in FIG. 1A and FIG. 1B. User device 202 may be implemented by a device, such as computing device 100 shown in FIG. 1C and FIG. 1D. According to some embodiments, user device 202 may include processor 212 and memory 214. In an example, processor 212 and memory 214 of user device 202 may be CPU 121 and main memory 122, respectively, as shown in FIGS. 1C and 1D. User device 202 may also include user interface 216 such as a keyboard, a mouse, a touch screen, a haptic sensor, voice-based input unit, or any other appropriate user interface. It shall be appreciated that such components of user device 202 may correspond to similar components of computing device 100 in FIGS. 1C and 1D, such as keyboard 126, pointing device 127, I/O devices 130*a-n* and display devices 124*a-n*. User device 202 may also include display 218, such as a screen, a monitor connected to the device in any manner, or any other appropriate display. In an implementation, user device 202 may display received content (for example, messages) for the user using display 218 and is able to accept user interaction via user interface 216 responsive to the displayed content.

Referring again to FIG. 2, in some embodiments, user device 202 may include email client 220. In one example implementation, email client 220 may be an application installed on user device 202. In another example implementation, email client 220 may be an application that can be accessed over network 210 through a browser without requiring to be installed on user device 202. In an implementation, email client 220 may be any application capable of composing, sending, receiving, and reading email messages. For example, email client 220 may be an instance of an application, such as Microsoft Outlook™ application, IBM® Lotus Notes® application, Apple® Mail application, Gmail® application, or any other known or custom email application. In an example, a user of user device 202 may be mandated to download and install email client 220 by the organization. In another example, email client 220 may be provided by the organization as default. In some examples, a user of user device 202 may select, purchase and/or download email client 220 through, for example, an application distribution platform. The term "application" as used herein may refer to one or more applications, services, routines, or other executable logic or instructions.

In one or more embodiments, email client 220 may include email client plug-in 222. An email client plug-in may be an application program that may be included in an email client for providing one or more additional features to enable customization. The email client plug-in may be provided by the same entity that provides the email client software or may be provided by a different entity. In an example, email client plug-in may include a User Interface (UI) element such as a button to trigger a function. Functionality of client-side plug-ins that use a UI button may be triggered when a user clicks the button. Some examples of client-side plug-ins that use a UI button include, but are not limited to, a Phish Alert Button (PAB) plug-in, a task create plug-in, a spam marking plug-in, an instant message plug-in, a social media reporting plug-in and a search and highlight plug-in. In an embodiment, email client plug-in 222 may be any of the aforementioned types of UI button email client plug-in or may be of any other type of email client plug-in 222.

In some implementations, email client plug-in 222 may not be implemented in email client 220 but may coordinate and communicate with email client 220. In some implementations, email client plug-in 222 is an interface local to email client 220 that supports email client users. In one or more embodiments, email client plug-in 222 may be an application that supports the user, i.e., recipients of simulated phishing messages, to report suspicious phishing messages that they believe may be a threat to them or their organization. Other implementations of email client plug-in 222 not discussed here are contemplated herein. In one example, email client plug-in 222 may provide the PAB plug-in through which functions or capabilities of email client plug-in 222 are triggered/activated by a user action on the button. Upon activation, email client plug-in 222 may forward content (for example, suspicious phishing message) to a system administrator. In some embodiments, email client plug-in 222 may cause email client 220 to forward content to threat detection system 208 or an Incident Response (IR) team of the organization for threat triage, quarantine or threat identification. In some embodiments, email client 220 or email client plug-in 222 may send a notification to threat detection system 208 that a user has reported content received at email client 220 as potentially malicious. Thus, the PAB plug-in button enables a user to report suspicious content.

Messaging system 204 may include processor 224, memory 226, and email server 228. For example, processor 224 and memory 226 of messaging system 204 may be CPU 121 and main memory 122, respectively, as shown in FIG. 1C and FIG. 1D. In an implementation, email server 228 may be any server capable of handling, receiving and delivering emails over network 210 using one or more standard email protocols, such as Post Office Protocol 3 (POP3), Internet Message Access Protocol (IMAP), Simple Message Transfer Protocol (SMTP), and Multipurpose Internet Mail Extension (MIME) Protocol. Email server 228 may be a standalone server or a part of an organization's server. Email server 228 may be implemented using, for example, Microsoft® Exchange Server, and HCL Domino®. In an implementation, email server 228 may be a server 106 shown in FIG. 1A. Email server 228 may be implemented by a device, such as computing device 100 shown in FIG. 1C and FIG. 1D. Alternatively, email server 228 may be implemented as a part of a cluster of servers. In some embodiments, email server 228 may be implemented across a plurality of servers, thereby, tasks performed by email server 228 may be performed by the plurality of servers. These tasks may be allocated among the cluster of servers by an application, a service, a daemon, a routine, or other executable logic for task allocation. In an implementation, user device 202 may receive simulated phishing message through email server 228 of messaging system 204.

In one or more embodiments, security awareness training system 206 may facilitate cybersecurity awareness training through simulated phishing attacks. In some implementations, security awareness training system 206 may be owned or managed or otherwise associated with an organization or any entity authorized thereof. A simulated phishing attack is a technique of testing a user to see whether the user is likely to recognize a true malicious phishing attack and act appropriately upon receiving the malicious phishing attack. The simulated phishing attack may include links, attachments, macros, or any other simulated phishing threat that resembles a real phishing threat. In response to a user interaction with the simulated phishing attack, for example if the user clicks on a link (i.e., a simulated phishing link), the user may be provided with security awareness training. In an example, security awareness training system 206 may be a Computer Based Security Awareness Training (CBSAT) system that performs security services such as performing simulated phishing attacks on a user or a set of users of the organization as a part of security awareness training. In some embodiments, the user may be an end-customer/consumer or a patron using the goods and/or services of the organization.

According to some embodiments, security awareness training system 206 may include various functionalities that may be associated with cybersecurity awareness training. In an implementation, security awareness training system 206 may include an application or a program that manages various aspects of a simulated phishing attack, for example, tailoring and/or executing a simulated phishing attack. A simulated phishing attack may test the readiness of a user to handle phishing attacks such that malicious actions are prevented. For example, security awareness training system 206 may monitor and control timing of various aspects of a simulated phishing attack including processing requests for access to attack results, and performing other tasks related to the management of a simulated phishing attack.

In some embodiments, security awareness training system 206 may include message generator 238 having virtual machine 240. Message generator 238 may be an application, service, daemon, routine, or other executable logic for generating messages. The messages generated by message generator 238 may be of any appropriate format. For example, the messages may be email messages, text messages, short message service (SMS) messages, instant messaging (IM) messages used by messaging applications such as WhatsApp™, or any other type of message. The message type to be used in a particular simulated phishing message may be determined by, for example, security awareness training system 206. The messages may be generated in any appropriate manner, e.g. by running an instance of an application that generates the desired message type, such as a Gmail® application, Microsoft Outlook™, WhatsApp™, a text messaging application, or any other appropriate application. The messages may be generated by running a messaging application on virtual machine 240 or may be run in any other appropriate environment. The messages may be generated to be in a format consistent with specific messaging platforms, for example Outlook365™, Outlook® Web Access (OWA), Webmail™, iOS®, Gmail®, and any other messaging platform. In an implementation, message generator 238 may be configured to generate simulated phishing messages. The simulated phishing messages may be used in simulated phishing attacks or in simulated phishing campaigns.

Referring back to FIG. 2, threat detection system 208 may be an electronic system configured to manage online security threats including phishing threats faced by the organization or by users of the organization. In examples, threat detection system 208 may host security applications that provide additional and/or custom features to user device 202. Examples of additional and/or custom features include antivirus, anti-phish, anti-malware and anti-spyware. Threat detection system 208 may be configured to perform antivirus scans, anti-phish scans, anti-malware scans and anti-spyware scans on incoming and outgoing messages. In one or more embodiments, threat detection system 208 may provide phishing message search engine 230 that is enabled by parsing unit 232, recommendation unit 234, search unit 236 and learning unit 242, for searching and identifying one or more other malicious messages corresponding to a reported malicious message in messaging system 204. For enabling a search, phishing message search engine 230 may provide a Graphical User Interface (GUI) with various options to construct a query and to execute a search. To enable searching using text segments from content of the reported malicious message, phishing message search engine 230 may remove malicious content from the reported malicious message for parsing. In one embodiment, parsing unit 232 may parse the content of the reported malicious message (without malicious content) to obtain plain text from the content (corresponding to the authoring language used to create the content). Parsing unit 232 may retrieve plain text from the content of the malicious message without any formatting such as markup format or rich text formats. In some embodiments, parsing unit 232 may use a known HTML, parser or CSS parser such as Nokogiri™ or Google Docs® ImportXML. In some embodiments, parsing unit 232 may use a proprietary parsing engine. Parsing unit 232 may be capable of identifying and retrieving a correct construction of plain text from the content when searching and analyzing the content of the malicious message through an Application programming interface (API). Parsing unit 232 may analyze the plain text retrieved from the content of the malicious message to identify one or more segments of plain text. In some embodiments, parsing unit 232 may use an array to store and process the one or more segments of plain text. Parsing unit 232 may use the array when constructing the one or more segments of plain text to ensure that the one or more segments of plain text are consistent with the content of the malicious message. Parsing unit 232 may provide the one or more segments of plain text for further processing.

Recommendation unit 234 may analyze the one or more segments of plain text provided by parsing unit 232 to identify segment(s) of plain text that can be provided as key content for the construction of a query. Recommendation unit 234 may provide a recommendation of identified segment(s) of plain text as key content for construction of a query from the one or more segments of plain text. In one or more embodiments, the recommendations may be based on identifying the most probable text segments that may be commonly found among variations of malicious messages. For example, the recommendations may be based upon: (i) unusual phrases in body of the email that do not occur commonly in regular emails within the organization; (ii) the presence of misspelt words (as is common in malicious phishing messages); (iii) irregular punctuation and other grammatical errors; and/or (iv) removal of forenames or surnames from message content. In one or more embodiments, recommendation unit 234 may use historical data of phishing content, statistical analysis, AI, ML engines, feedback from learning unit 242 on key content determination and selection based on the false positive rate of the search, and other techniques to identify and recommend the most probable text segment(s) of plain text as the key content for the construction of the query among the one or more segments of plain text.

Based on selected segment(s) of plain text as key content for constructing the query, recommendation unit 234 may identify the one or more match criteria for matching the selected segment(s) of plain text to one or more messages. The one or more match criteria may include subject, sender, recipients, message attachment and message body. Recommendation unit 234 may recommend the one or more match criteria for matching the selected segment(s) of plain text to one or more messages. Using the recommendation or without recommendation, threat detection system 208 or a system administrator may be enabled to construct a query. In some embodiments, the query may include subqueries formatted into a single query. For example, the subqueries may include a subquery that is directed at searching a sender field of the one or more messages and another subquery that includes one or more segments of plain text directed at searching one or more substrings in the message body by segment instead of searching as one string. In some embodiments, threat detection system 208 may automatically generate one or more queries for the search. In examples, threat detection system 208 may use the one or more queries separately or may combine the one or more queries into a single query for the search. Search unit 236 may execute a search on messaging system 204 based on the query. In one or more embodiments, search unit 236 may perform the search through an API, such as Microsoft's GRAPH API®, Google's Gmail® API and other such API's. The APIs may allow search unit 236 to query different parts of the one or more messages to identify matches to the one or more segments of plain text with portion or all content of the one or more messages in messaging system 204. An example construction of API queries using Microsoft® GRAPH API® is briefly described in following sentences. Microsoft® GRAPH API® provides a "$search" query parameter to request results that match a search criterion. An example of the "$search" query parameter is GET https://graph.microsoft.com/v1.0/me/messages?Ssearch="pizza".

The example searches for the term "pizza" in messages. The "$search" query parameter may also be used for specifically searching body of the message. An example of using "$search" query parameter for searching body of messages is: me/messages?$search="body:excitement". Any query for message body may be formatted into a single query that searches for a collection of substrings in the body by segment instead of as one string. For example, a query for the body of the message may return arrays of text segments without HTML formatting such as HTML code or CSS code. An example of an excerpt of code is provided from an example query, where the term 'invoice' is italicized in the reported malicious message, therefore in a different segment than the rest of the body:

queried_fields: ["subject', "from", "body"]
"$search="(subject:\"invoice+test\")  from: user@xyze.com  (body: \"here+is+your\" AND \"invoice\") received>=2020-08-15t15:15z".

Learning unit 242 is configured to validate the query and key contents of the query in a search based on measure of success in identifying the one or more other malicious messages corresponding to the reported malicious message. The measurement of success may be defined using a threshold. The threshold may be set by threat detection system 208 or may be set by a system administrator based on error tolerance. In some examples, the threshold may be set to 95%, 90%, 85% or any percentage based on the system administrator. In embodiments, when result of the search falls short of the threshold, learning unit 242 may use the segment(s) of plain text used as key content and/or the query as input to learning and improvising the selection of one or more segments of plain text as key content for construction of query with the purpose of lowering false positive messages and increasing number of other malicious messages corresponding to the reported malicious message in the search result. Learning unit 242 may utilize AI and ML engines that receive the input to learn and improvise the selection of one or more segments of plain text as key content for construction of a query. Learning unit 242 may use such inputs as training datasets for training the AI and ML engines to identify which key content, query and which combinations of key content in a query are most effective in finding as many of the malicious messages corresponding to the reported malicious message, and not finding messages that are benign. In some embodiments, recommendation unit 234 may provide recommendations to learning unit 242 on key content, query and which combinations of key content in a query are most effective in finding as many of the malicious messages corresponding to the reported malicious message, and not finding messages that are benign. In some embodiments, learning unit 242 and recommendation unit 234 may maintain individual AI and ML engines that communicate mutually. In some embodiments, learning unit 242 and recommendation unit 234 may maintain AI and ML engines common to learning unit 242 and recommendation unit 234.

Referring back to FIG. 2, phishing message search engine 230 may provide search options including a manual search, a recommendation-based search and a fully automatic search. For manual search, phishing message search engine 230 may provide a GUI for a system administrator to facilitate a search for one or more other malicious messages corresponding to the reported malicious message. The GUI may include various options supporting the system administrator or threat detection system 208 in constructing a query and executing search. The options may include match criteria, time frame selection, quarantine option and customized criteria option. The time frame selection may enable the system administrator to set a period in time within which the one or more messages that may correspond to the reported malicious message may have to be searched. For example, a time frame may be set as 24 hours. Based on the set 24 hours period, phishing message search engine 230 may search for one or more messages that may correspond to the reported malicious message within the last 24 hours. In examples, a quarantine all option may provide an option for the system administrator to select to have one or more messages in the search result quarantined. In response to the selection of the option by the system administrator to select to have one or more messages in the search result quarantined, phishing message search engine 230 may quarantine all the messages obtained in the search. Customized criteria option enables the system administrator to construct the query by selecting one or more match criteria. Customized criteria option may provide options to select and input text segments in the one or more match criteria to construct queries. Phishing message search engine 230 may process the selection and input text segments to generate queries. In some embodiments, phishing message search engine 230 may combine the queries to a single query that would be used for a search. Post the construction of the query, the system administrator or threat detection system 208 may be enabled to use search option provided by the GUI to execute a search.

In response to execution of the search, phishing message search engine 230 may provide a search result based on the query in a form of a message list including one or more messages. The system administrator or threat detection system 208 may validate the query comprising key content based at least on a measure of success in identifying the one or more other malicious messages corresponding to the reported malicious message and not identifying messages that are not malicious messages in the search result based on the query defined based on key content of the reported malicious message. In one embodiment, phishing message search engine 230 may provide an option to use an anti-phish scan to scan the one or more messages in the search result to identify the one or more other malicious messages corresponding to the reported malicious message in the one or more messages. The anti-phish scan may have been updated to scan the one or more messages for malicious content based on learning from the reported malicious message. Phishing message search engine 230 may provide a result of scan along with information that indicates the measure of success in identifying the one or more other malicious messages corresponding to the reported malicious message. In some embodiments, phishing message search engine 230 may enable the system administrator to set a threshold (for example, 95%, 90%, etc.) to define success of the query or key content of the reported malicious message. In examples, phishing message search engine 230 may enable the system administrator or threat detection system 208 to monitor the one or more messages identified by the search to determine a number of false positives arising from the search. In examples, phishing message search engine 230 may recommend that one or more other malicious messages corresponding to the reported malicious message identified from the search are quarantined. Based on the measure of success in identifying the one or more other malicious messages corresponding to the reported malicious message, phishing message search engine 230 may provide recommendations to modify the query to perform additional searches until the search exceeds the threshold indicating the measure of success in identifying the one or more other malicious messages corresponding to the reported malicious message.

For the recommendation-based search, phishing message search engine 230 may provide a GUI similar to the manual search GUI for a system administrator to facilitate a search for one or more other malicious messages corresponding to the reported malicious message. In the recommendation-based search, phishing message search engine 230 may assist the system administrator by obtaining content from the reported malicious message, providing recommendations of one or more segments of the plain text as key content for constructing a query, selecting the recommendation of segment(s) in the plain text as key content and/or one or more segments of the plain text not recommended for construction of a query, identifying one or more match criteria for matching the selected segment(s) of plain text to one or more messages, constructing the query based at least of segment(s) in the plain text as key content and/or one or more segments of the plain text not recommended for construction of the query and one or more match criteria, and executing search. On similar lines of manual search, phishing message search engine 230 may enable the system administrator and threat detection system 208 to validate the key content or query having the key content based at least on a measure of success in identifying the one or more other malicious messages corresponding to the reported malicious message and not identifying messages that are not malicious messages in the search result based on the query defined based on key content of the reported malicious message. Phishing message search engine 230 may recommend anti-phish scan on the search result, and enable the system administrator to set a threshold to measure success of the query or key content in the query. In examples, phishing message search engine 230 may recommend that one or more other malicious messages corresponding to the reported malicious message identified from the search are quarantined. Phishing message search engine 230 may recommend the system administrator to monitor the one or more messages identified by the search to determine a number of false positives arising from the search. Based on the measure of success in identifying the one or more other malicious messages corresponding to the reported malicious message, recommendation unit 234 may recommend options to modify the query to perform additional searches to improve the percentage of the one or more other malicious messages corresponding to the reported malicious message in results of the search.

For the fully automatic search, phishing message search engine 230 may perform the search without any intervention by the system administrator by selecting content from the reported malicious message, parsing plain text from the content using parsing unit 232, identifying one or more segments in the plain text, generating a recommendation of segment(s) in the plain text as key content, selecting the recommendation of segment(s) in the plain text as key content and/or one or more segments of the plain text not recommended for construction of a query, identifying one or more match criteria for matching the selected segment(s) of plain text to one or more messages, constructing the query based at least on segment(s) in the plain text as key content according to query construction rules, and/or one or more segments of the plain text not recommended for construction of the query and one or more match criteria, and executing a search in messaging system 204 for one or more other messages corresponding to the reported malicious message using the selected one or more segments of the plain text as query with one or more match criteria. Learning unit 242 may automatically analyze search results to validate the key content in the query and/or the query itself based at least on a measure of success of key content in the query and/or the query itself by identifying the one or more other malicious messages corresponding to the reported malicious message. In an example, phishing message search engine 230 may automatically execute an anti-phish scan on the search results to identify the one or more malicious messages corresponding to the reported malicious message based on a recent learning from the reported malicious message. Based on the results of the anti-phish scan, learning unit 242 may validate the query based at least on a measure of success in identifying the one or more other malicious messages corresponding to the reported malicious message, and not identifying messages that are not malicious messages in the search result based on the query defined based on key content of the reported malicious message. In examples, phishing message search engine 230 may quarantine some of or all the one or more other malicious messages corresponding to the reported malicious message identified from the anti-phish scan. In some examples, phishing message search engine 230 may automatically set a threshold to determine the success of the query or key content in the query. For example, phishing message search engine 230 may set the threshold to 95%, 90% or 85%, based on known error tolerance of the system administrator, where number of other malicious messages corresponding to the reported malicious message is expected to meet or exceed above the threshold number in the search results. Learning unit 242 may analyze the queries to determine effective queries and combinations of key content that are most effective in finding as many of the malicious messages corresponding to the reported malicious message, while avoiding finding messages that are not malicious. In some embodiments, recommendation unit 234 may provide recommendations to learning unit 242 on key content, query and which combinations of key content in a query are most effective in finding as many of the malicious messages corresponding to the reported malicious message, and not finding messages that are benign. Recommendation unit 234 may provide recommendations to phishing message search engine 230 to modify the query, and phishing message search engine 230 may modify the query based on recommendations to increase the number of other malicious messages corresponding to the reported malicious message and decrease the number of messages that are not malicious messages in the search result.

In response to quarantining the one or more other malicious messages corresponding to the reported malicious message, threat detection system 208 may neutralize the one or more other malicious messages corresponding to the reported malicious message by modifying, removing or replacing phishing elements such as phishing links, phishing attachments and such elements. Threat detection system 208 may communicate one or more neutralized messages to security awareness training system 206 for conducting simulated phishing campaigns. Security awareness training system 206 may modify the one or more neutralized messages by placing simulated phishing elements in the one or more neutralized messages to develop simulated phishing messages. Using the simulated phishing messages, security awareness training system 206 may launch simulated phishing campaigns to develop security awareness for the users related to the reported malicious message.

In an implementation, threat detection system 208 and security awareness training system 206 may communicate directly (via network 210) with user device 202. In some implementations, security awareness training system 206 and threat detection system 208 may communicate with user device 202 through messaging system 204. In an example, security awareness training system 206 and threat detection system 208 may interact with messaging system 204 in order to perform their functionalities (for example, through messaging system 204) including, but not limited to, receiving reported/forwarded messages, retracting malicious messages, adding benign elements in place of malicious elements, and linking the benign elements with a landing page or training materials. Although, security awareness training system 206 and threat detection system 208 are shown as separate entities, security awareness training system 206 and threat detection system 208 may be implemented as a single entity and managed by a third-party entity or the organization. In some embodiments, functions of threat detection system 208 may be performed by security awareness training system 206. In some embodiments, functions of security awareness training system 206 may be performed by threat detection system 208. In some embodiments, threat detection system 208 may be managed by a third-party entity and security awareness training system 206 may be managed by the organization or vice-versa.

According to some embodiments, each of messaging system 204, security awareness training system 206 and threat detection system 208 may be implemented in a variety of computing systems, such as a mainframe computer, a server, a network server, a laptop computer, a desktop computer, a notebook, a workstation, and any other computing system. In an implementation, each of messaging system 204, threat detection system 208 and security awareness training system 206 may be implemented in a server, such as server 106 shown in FIG. 1A. In some implementations, messaging system 204, threat detection system 208, and security awareness training system 206 may be implemented by a device, such as computing device 100 shown in FIGS. 1C and 1D. In some embodiments, each of messaging system 204, threat detection system 208, and security awareness training system 206 may be implemented as a part of a cluster of servers. In some embodiments, each of messaging system 204, threat detection system 208, and security awareness training system 206 may be implemented across a plurality of servers, thereby, tasks performed by each of messaging system 204, threat detection system 208, and security awareness training system 206 may be performed by the plurality of servers. These tasks may be allocated among the cluster of servers by an application, a service, a daemon, a routine, or other executable logic for task allocation.

For an organization, users, such as their employees, are an essential line of defense for any phishing attack. The organization and the system administrator may rely on the users to report suspicious emails or messages quickly to mitigate any possibility of phishing attacks. In one embodiment, the organization may leverage savvy users or well-informed users in the organization who may quickly identify and report suspicious emails/messages. The system administrator may include cyber security personnel who are responsible for safety and security of data, content, and hardware and software assets of the organizations. The system administrator may be a part of IT department managing the internal and external networks associated with the organization. In one or more embodiments, threat detection system 208 may perform identification and neutralizing of the malicious messages on priority to substantially reduce a possibility of successful phishing of one or more users.

In operation, a user of user device 202 may receive a message from a sender, such as a third-party or an unknown user, in his or her mailbox. Accordingly, the user may be any recipient of the message. Also, in an example, the user may be a technically savvy or a well-informed employee of the organization who has a high level of security awareness. In an implementation, the user may receive the message through messaging system 204. On receiving the message, if the user suspects that the message is a malicious phishing message, the user may report the message using email client plug-in 222. For example, an account manager of an organization may receive a message that appears from a known client having a subject 'Statement of account' and includes a link to an external location in the message body. The account manager who is accustomed to receiving messages with statements in the message body may find the message suspicious due to the presence of the link in the message body. Accordingly, the account manager who may be trained to spot phishing messages may identify the message to be a suspicious or possibly a phishing attack or a threat. The user may react by reporting the suspicious message as a malicious message. In an example, the user may click on the PAB plug-in User Interface (UI) button element using, for example, a mouse pointer to report the message. In another embodiment, the user may forward the message as potentially malicious to a security contact point or threat detection system 208 through designated routes.

In an implementation, when the user reports the message, a report of a malicious message is sent to threat detection system 208. In an example, if the message is an email message and the user reports the message through the PAB plug-in UI provided in email client 220, email client plug-in 222 may receive an indication that the user has reported the message received at the user's mailbox or email account as potentially malicious. In response to receiving the indication that the user has reported the message as potentially malicious, email client plug-in 222 may analyze the message to identify a simulated phishing indicator in the message. The indicator may be found in message header, message body or other parts of message. In response to an absence of the simulated phishing indicator, email client plug-in 222 may cause email client 220 to forward the message or a copy of the reported message to threat detection system 208 for analysis and action. In some embodiments, email client 220 or email client plug-in 222 may send a notification to threat detection system 208 that the user has reported the message received at the user's mailbox as potentially malicious. In response, threat detection system 208 may retrieve the message from the user's mailbox or from messaging system 204 for further processing. Various combinations of reporting, retrieving, and forwarding the message to threat detection system 208 are contemplated herein.

According to some embodiments, a user may also forward the message identified as potentially malicious to a security contact point. Examples of the security contact point may include but are not limited to, a system administrator, a security manager, Information Technology (IT) manager, and the like. In some examples, a security workflow in an organization may include instructions to forwarding the message identified as potentially malicious to a system administrator or security contact point mailbox among other options for a user to report when the user receives a suspicious message. In an example, a record of an original recipient of the message may be captured in the forwarded message. In an implementation, a security contact point mailbox and/or the system administrator may forward the message to threat detection system 208 for further processing. In some implementations, threat detection system 208 may retrieve a reported message from the security contact point mailbox.

In an implementation, threat detection system 208 may process a reported message to determine whether the reported message is a malicious phishing message. In one example, the reported message may have passed through the anti-phish scan initially without being identified as a phishing message due to a characteristic of the phishing message. In some implementations, threat detection system 208 may determine whether a reported message is a malicious phishing message using a rule set of one or more characteristic detection rules. A characteristic detection rule may comprise characteristic detection rule metadata, and/or a characteristic detection rule name. In embodiments, a characteristic detection rule may be a YARA rule. The determination of whether a reported message is a malicious phishing message using a rule set of one or more characteristic detection rules is known and therefore is not explained in detail for sake of brevity. This process may also be referred to as an anti-phish scan and used by phishing message search engine 230 to identify one or more other malicious messages corresponding to the reported malicious message. In some examples, the reported message may be processed (or "detonated") in a quarantined environment or in a sandbox to determine if the reported message is a malicious phishing message. Upon determining that a message is a malicious phishing message, threat detection system 208 may remove malicious content from the reported message. Threat detection system 208 may initiate a process of searching and identifying one or more other malicious messages corresponding to a reported malicious message in messaging system 204. In embodiments, threat detection system 208 may launch phishing message search engine 230 to perform the search. Phishing message search engine 230 may provide manual search, recommendation-based search and fully automatic search options to a system administrator to facilitate a search on messaging system 204.

In response to a system administrator selecting the manual search option, phishing message search engine 230 may provide a GUI to facilitate the search. The GUI may include various options such as including match criteria, time frame selection, quarantine option and customized criteria option to construct a query. The system administrator may use one or more options provided by the GUI to construct a query and perform the search. In response to the system administrator constructing a query and executing a search based on the query, phishing message search engine 230 may provide search results. The search results may include one or more messages from messaging system 204. The one or more messages in the search result may include one or more other malicious messages corresponding to the reported malicious message and one or more messages that are not malicious or benign. Phishing message search engine 230 may enable the system administrator to validate the query or key content in the search query based at least on a measure of success in identifying the one or more other malicious messages corresponding to the reported malicious message from the messages from messaging system 204, and not identifying messages that are not malicious messages in the search result based on the query defined based on key content of the reported malicious message. To measure success in identifying the one or more other malicious messages corresponding to the reported malicious message, phishing message search engine 230 may provide an anti-phish scan option. The system administrator may perform the anti-phish scan on one or more messages in the search result to determine the one or more other malicious messages corresponding to the reported malicious message from the one or more messages in the search result. The scan result may indicate the success in identifying the one or more other malicious messages corresponding to the reported malicious message by indicating percentage of the one or more other malicious messages corresponding to the reported malicious message in the one or more messages of the search result. As described above, phishing message search engine 230 may set a threshold to measure success. In an example, phishing message search engine 230 may set a threshold of 90%, where the one or more other malicious messages corresponding to the reported malicious message is expected to meet or exceed 90% of search results. The percentage in the anti-phish scan may be compared with the threshold to determine the success of the key content in the query or the query itself. The scan result may also enable the system administrator in determining the number of messages that are non-malicious or false positive messages in the one or more messages of the search result. Based on the percentage of the one or more other malicious messages corresponding to the reported malicious message in the one or more messages of the search result, phishing message search engine 230 may provide customized criteria options to threat detection system 208 to construct a different query or modify the query and/or key content in the query to improve the percentage of the one or more other malicious messages corresponding to the reported malicious message in the one or more messages of the search result while reducing the percentage of non-malicious or false positive message in the one or more messages of the search result. In examples, phishing message search engine 230 may quarantine some of or all other malicious messages identified in the search. Threat detection system 208 may continue to iteratively perform searches until threat detection system 208 or phishing message search engine 230 provides results in which the percentage of the one or more other malicious messages corresponding to the reported malicious message in the one or more messages of the search result meets or exceeds the threshold.

In response to the system administrator choosing the recommendation-based search option, phishing message search engine 230 may provide a GUI window with various options that is similar to GUI for facilitating the manual search. However, instead of the system administrator choosing the key content via manual inspection, phishing message search engine 230 may parse the content of the malicious message and provide recommendations of one more segments of plain text as key content for construction of the query. The system administrator may choose the recommendations in constructing a query. The system administrator may also choose to add one or more segments of plain text that are not recommended in constructing the query. Using the query, the system administrator may execute the search in phishing message search engine 230. The search results may include one or more messages from messaging system 204. The one or more messages in the search result may include one or more other malicious messages corresponding to the reported malicious message and one or more messages that are not malicious or benign. The system administrator may be enabled to validate the key content in the query or the query itself based at least on a measure of success in identifying the one or more other malicious messages corresponding to the reported malicious message from the messages in messaging system 204, and not identifying messages that are not malicious messages in the search result based on the query defined based on key content of the reported malicious message. Phishing message search engine 230 may recommend executing an anti-phish scan on the one or more messages in search result. Based on the scan result, phishing message search engine 230 may determine the success in identifying the one or more other malicious messages corresponding to the reported malicious message by determining the percentage of the one or more other malicious messages corresponding to the reported malicious message in the one or more messages of the search result. Based on the percentage of the one or more other malicious messages corresponding to the reported malicious message in the one or more messages of the search result, phishing message search engine 230 may recommend constructing a different query or modification of the query and/or key content in the query to improve the percentage of the one or more other malicious messages corresponding to the reported malicious message in the one or more messages of the search result while reducing the percentage of non-malicious or false positive message in the one or more messages of the search result.

In response to the system administrator choosing the fully automatic search option, phishing message search engine 230 may use the same analytical techniques of the recommendation-based search option but may not present any recommendation to the system administrator. Instead, phishing message search engine 230 may use the recommendations in constructing a query and executing the search. Based on the percentage of the one or more other malicious messages corresponding to the reported malicious message in the one or more messages of the search result, phishing message search engine 230 may generate recommendation and use the recommendation to construct a different query or modify the query and/or key content in the query to improve the percentage of the one or more other malicious messages corresponding to the reported malicious message in the one or more messages of the search result while reducing the percentage of non-malicious or false positive message in the one or more messages of the search result.

Consider an example of a recommended-based search. A user reports a message that the user believes is a malicious phishing message. Threat detection system 208 may determine whether the reported malicious message is a malicious phishing message using a rule set of one or more characteristic detection rules. Upon determining that the message is a malicious phishing message, threat detection system 208 may process the reported malicious message for parsing. The reported malicious message body may include text that says, "Hello John, here is your invoice." and the message includes a malicious attachment named "accounts urgent". The system administrator may recognize that the name of the addressee ("John") within the body of the message is likely to be different in different malicious messages, corresponding to the reported malicious message, sent to other users. Phishing message search engine 230 may parse the content of the reported malicious message. In the example, phishing message search engine 230 may provide "Hello John" and "here is your invoice" as sections of plain text parsed from content of the reported malicious message. Phishing message search engine 230 may provide options to select via a GUI, specific text from the body of that message that may likely capture one or more other messages corresponding to the reported malicious message, or other similar messages in other users' mailboxes of messaging system 204 while at the same time ensuring there are not a significant number of false positives where messages that are benign are also identified. In one embodiment, phishing message search engine 230 may recommend the one or more segments of plain text as a key content for construction of a query. Using the aforementioned example, phishing message search engine 230 may recommend the one or more segments of plain text "Hello," and "here is your invoice" as a key content. The system administrator may select the recommendation for construction of a query. Based on the content in the reported message, phishing message search engine 230 may identify the one or more match criteria for matching the selected one or more segments to one or more messages. In the example, phishing message search engine 230 may identify the match criteria as "message body" for matching text segments "Hello," and "here is your invoice" to one or more messages. Post matching, phishing message search engine 230 may recommend constructing a query based at least on text segments "Hello," and "here is your invoice" and match criteria "message body". The system administrator may accept the recommendation to construct the query. Using the query, phishing message search engine 230 may execute a search in messaging system 204 for one or more other malicious messages corresponding to the reported malicious message using the text segments "Hello," and "here is your invoice" and match criteria "message body". Phishing message search engine 230 may search for the text segments "Hello," and "here is your invoice" in message body of one or more messages in messaging system 204.

In response to the execution of the search phishing message search engine 230 may respond to the search request by returning with search results having one or more messages from messaging system 204 based on the query. Phishing message search engine 230 may recommend the system administrator to validate the key content in the query or the query itself by reviewing the one or more messages in search result. In one embodiment, phishing message search engine 230 may recommend the system administrator perform an anti-phish scan on the search results. Based on the scan, the system administrator or threat detection system 208 may determine effectiveness of the query and the key content used in the query based on identifying percentage of one or more other malicious messages corresponding to the reported malicious message and one or more false positive messages in the search result. In the example, the search result may show 89% of messages being other malicious messages corresponding to the reported malicious message and 11% of messages being false positives. Phishing message search engine 230 may provide recommendations to modify the query to include a text segment "urgent" in "message attachment" match criteria based on the knowledge gained from analysis of the reported message. The system administrator may accept the recommendation to modify the query to include a text segment "urgent" in "message attachment" match criteria in addition to the text segments "Hello," and "here is your invoice" in match criteria "message body". The system administrator may execute the search with the modified query resulting in search report having 95% of messages being other malicious messages corresponding to the reported malicious message and 5% of messages being false positives. Phishing message search engine 230 may recommend the system administrator to select an option to quarantine the other malicious messages corresponding to the reported malicious message.

A search of the mailboxes of all the users in messaging system 204 within the organization may or may not result in the identification of all other instances of malicious messages corresponding to the reported malicious message in other users' mailboxes. Threat detection system 208 may modify the query based upon how successful the key content is at identifying one or more other malicious messages corresponding to the reported malicious message. In an example, another message which is substantially similar to the reported malicious message may be reported by another user but may not have been captured in the search results. Such reporting may indicate that the search may not have been successful in identifying and quarantining malicious messages corresponding to the reported malicious message. In an example of manual search, threat detection system 208 may present the newly reported malicious message to the system administrator to enable the system administrator to identify similarities between the messages that did not form part of the key content of the first search. In an example of recommendation-based search, threat detection system 208 may perform an automatic comparison of the two reported malicious messages and make recommendations to the system administrator for additional key content to be included in a subsequent search. In an example of fully automatic search, threat detection system 208 may perform an automatic comparison and adapt the search terms without any input from the system administrator.

Threat detection system 208 may also monitor the number of false positives (for example, a similar message but not a malicious phishing message) arising from the search. Threat detection system 208 may identify such false positive messages by analyzing the messages removed from user's inboxes and finding that they are not malicious. In an example of manual search, threat detection system 208 may present the system administrator with a false positive message to enable the system administrator to identify similarities between the messages that formed part of the key content of the first search. Such presentation may enable the system administrator to remove this key content from the search and reduce the number of false positives in a subsequent search. In an example of recommendation-based search, phishing message search engine 230 may perform an automatic comparison of the reported malicious message and the false positive message, and may provide recommendations to the system administrator for key content to be removed in a subsequent search. In an example of fully automatic search, threat detection system 208 may perform an automatic comparison of the reported malicious message and the false positive message and adapt the search terms without any input from the system administrator.

FIG. 3 depicts an exemplary GUI 300 provided for the system administrator, other appropriate personnel, the threat detection system and/or any other IT system within the organization for searching for one or more malicious messages in messaging system 204 corresponding to the reported malicious message, according to some embodiments. Phishing message search engine 230 provided by threat detection system 208 may enable the system administrator to perform a manual search or a recommendation-based search for one or more malicious messages in messaging system 204 corresponding to the reported malicious message. As shown in FIG. 3, GUI 300 provides one or more options to construct queries. GUI 300 may provide options including match criteria option 302, time frame selection option 304, quarantine all option 306 and customized criteria option 308.

Match criteria option 302 may provide criteria category such as subject, sender, recipients, message attachments and message body options, which can be selected by the system administrator. Along with a query, phishing message search engine 230 may use the selected option to search for the one or more other malicious messages corresponding to the reported malicious across all of the mailboxes in messaging system 204. Time frame selection option 304 may provide a choice to the system administrator to specify a time frame of sending or receipt in which the one or more other malicious messages corresponding to the reported malicious message may be searched. By default, phishing message search engine 230 may set the time frame to find the one or more other malicious messages corresponding to the reported malicious message in the last 24 hours. Phishing message search engine 230 may provide a GUI drop-down menu to adjust the search window to the last 72 hours, last week, last month, last quarter or any other suitable time frame. Quarantine all option 306 enables the system administrator to select to have one or more messages in the search result quarantined. Phishing message search engine 230 may quarantine the one or more messages returned as a result of the search using the query as result of the selection of quarantine all option 306. When chosen by the system administrator, phishing message search engine 230 may move all messages found in the search to a quarantine folder or other storage. Customized criteria option 308 enables the system administrator to create a new query by selecting one or more of the following fields: subject, sender, recipient, attachment and body by modifying the text field. The subject field may require a minimum of four characters that were found in the reported malicious message subject line for the customized criteria search to work. The sender and recipient fields may require that a query may be a substring or subdomain of the reported malicious message address(es). The attachment field may require that the search is a substring of attachment name of the reported malicious message and may require a minimum of 3 characters found in the attachment line. The body field may require that the search is a substring of the reported malicious message and may require a minimum of 30 words or 50% of content found in the reported malicious message. As described, match criteria option may be selected as part of the construction of the search.

The system administrator may choose one or more match criteria (for example, subject and message body), select a time frame for period in time for the search, optionally select an option to quarantine all the search results. The system administrator may choose customized criteria option 308 to select one or more match criteria and add text segments in corresponding selected match criteria in generating the query. Selection of one or more match criteria, selecting a time frame and customized criteria option 308 may lead to construction of multiple queries. Phishing message search engine 230 may combine the queries to generate a query to be used in search. One aspect of phishing message search engine 230 may be the identification of key content to be found in the body of the message. The system administrator may execute the search by using a search UI button shown at bottom of GUI 300. Phishing message search engine 230 may respond to the search request by returning with search results including the one or more other malicious messages corresponding to the reported malicious message.

FIG. 4 depicts a process flow 400 for identifying one or more malicious messages in a messaging system corresponding to a reported malicious message, according to some embodiments.

Step 402 includes receiving a report of a malicious message from a user using messaging system 204. In one example, the user may report the malicious message using email client plug-in 222 (for example PAB plug-in button) provided in email client 220. In another example, the user may report the malicious message by forwarding the message to the security contact point. In response to receiving the report, threat detection system 208 may initiate a process to identify one or more other malicious messages corresponding to a reported malicious message from messaging system 204. Threat detection system 208 may process the reported malicious message to select content. The content may be in a markup language format including formatting, styles and coding. In one or more embodiments, parsing unit 232 may parse the plain text from the content using parsing unit 232. In an example, parsing unit 232 may use a HTML, or a CSS parser to parse the plain text from the content.

Step 404 includes providing plain text of content selected from the malicious message. Parsing unit 232 may identify one or more segments of plain text as key content for construction of a query. In one or more embodiments, recommendation unit 234 may generate a recommendation of the one or more segments of plain text as key content for construction of query. The recommendations may be based on identifying most probable text segments that may be commonly found among variations of the reported malicious message. In one or more embodiments, recommendation unit 234 may use statistical analysis of historical data, AI, ML and other such techniques to identify the most probable text segments for providing recommendations.

Step 406 includes selecting one or more segments of the plain text as key content for construction of a query. In one or more embodiments, phishing message search engine 230 may select the one or more segments from the recommendations provided by recommendation unit 234. Threat detection system 208 may identify the one or more match criteria for matching the selected one or more segments to one or more messages. Search unit 236 may enable construction of the query based at least on the one or more segments of the plain text and the one or more match criteria.

Using the query, step 408 includes executing a search in messaging system 204 for one or more other malicious messages corresponding to the reported malicious message using the selected one or more segments of the plain text with one or more match criteria or no criteria. In one or more embodiments, search unit 236 may execute the search based on the query.

Step 410 includes identifying in messaging system 204, one or more other malicious messages corresponding to the reported malicious message in response to the search. Phishing message search engine 230 may return with one or more messages from messaging system 204 in response of the search execution. The one or more messages may include one or more other malicious messages corresponding to the reported malicious message as well as one or more messages that are non-malicious. Threat detection system 208 may analyze the search result having one or more messages to validate based at least on a measure of success in identifying the one or more other malicious messages corresponding to the reported malicious message. In one example, threat detection system 208 may set a threshold of 90%, where the one or more other malicious messages corresponding to the reported malicious message form 90% of search results, as the measure of success of the query. Phishing message search engine 230 may enable modifying the query to improve the search results. In some embodiments, phishing message search engine 230 may provide recommendations to modify the query. Phishing message search engine 230 may quarantine the one or more other malicious messages corresponding to the reported malicious message identified in the search.

Threat detection system 208 may neutralize or remove the malicious content from the one or more other malicious messages placed in the quarantine. In one or more embodiments, threat detection system 208 may analyze the one or more other malicious messages identified in the search before quarantining to identify malicious content(s) in the one or more other malicious messages. In one or more embodiments, the one or more malicious messages that are neutralized may be modified with phishing training content and used by security awareness training system 206 for security awareness training. Security awareness training system 206 may launch a security campaign soon thereafter to raise awareness of a phishing threat corresponding to the reported malicious message. In some embodiments as a part of the security awareness training campaign, the security awareness training system may place the neutralized malicious message having simulated phishing or training content back into the inboxes of the one or more users for security awareness training. In other words, the one or more malicious messages that are neutralized may be used in simulated phishing campaigns for training one or more users for developing, improving or familiarizing the users on phishing threats. Security awareness training system 206 may launch the simulated phishing campaign to test and educate the users on the latest phishing attempts.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method for identifying other instances of a reported malicious message, the method comprising:
    receiving, by one or more servers, a report of a malicious message from a user of a plurality users using a messaging system;
    providing, by the one or more servers responsive to the report of the malicious message, plain text of content selected from the malicious message;
    identifying, by a recommendation engine, segments commonly found in variations of malicious messages comprising at least one of an unusual phrase, misspelt word or grammatical error;
    generating, by the recommendation engine of the one or more servers using at least one or more of the identified segments commonly found among variations of malicious messages, a recommendation of one or more segments of the malicious message from the plain text of content to use as key content in construction of a query;
    selecting, via the one or more servers responsive to the recommendation, the one or more segments of the plain text as key content for construction of the query;
    constructing, via the one or more servers, the query to match the one or more segments in one or more fields of an electronic message identified by one or more match criteria, the one or more selected fields identifying one or more of a sender, recipient, subject, attachment or body of the electronic message;
    executing, by the one or more servers, the query in the messaging system for one or more other malicious messages corresponding to the reported malicious message; and
    identifying, by the one or more servers, in the messaging system the one or more other malicious messages corresponding to the reported malicious message.

2. The method of claim 1, further comprising selecting, by the one or more servers, content from the malicious message.

3. The method of claim 1, further comprising parsing, by the one or more servers, the plain text from the content using a parser to parse out the plain text from content corresponding to authoring language used to create the content.

4. The method of claim 1, wherein the recommendation is based at least on one or more of the following identified segments commonly found among variations of malicious messages: i) unusual phrases in a body of a message that do not occur commonly in regular messages within an organization; (ii) the presence of misspelt words; (iii) irregular punctuation or grammatical error; and (iv) removal of forenames or surnames from the content of the message.

5. The method of claim 1, further comprising identifying, by the one or more servers, the one or more match criteria for matching the selected one or more segments to one or more messages.

6. The method of claim 1, further comprising constructing, by the one or more servers, the query based at least on the one or more segments of the plain text and the one or more match criteria recommended by the one or more servers.

7. The method of claim 6, further comprising constructing the query to be formatted into a single query that searches a body of one or more messages for a collection of the one or more segments of the plain text matching the one or more match criteria.

8. The method of claim 1, further comprising validating, by the one or more servers, the query based at least on a measure of success in identifying the one or more other malicious messages corresponding to the reported malicious message, wherein the message of success is compared to a threshold, wherein the recommendation engine provides one or more recommendations to modify the query to perform additional searches until the search exceeds the threshold.

9. The method of claim 1, further comprising quarantining, by the one or more servers, the one or more other malicious messages identified from the query.

10. The method of claim 1, further comprising monitoring, by the one or more servers, the one or more other messages identified by the query to determine a number of false positives arising from the query.

11. A system for identifying other instances of messages corresponding to a reported malicious message, the system comprising:
    one or more servers comprising one or more processors, coupled to memory and configured to:
    receive a report of a malicious message from a user of a plurality users using a messaging system;
    provide, responsive to the report of the malicious message, plain text of content selected from the malicious message;
    identifying, by a recommendation engine, segments commonly found in variations of malicious messages comprising at least one of an unusual phrase, misspelt word or grammatical error;
    generate, by the recommendation engine of the one or more servers using at least one or more of the identified segments commonly found among variations of malicious messages, a recommendation of one or more segments of the malicious message from the plain text of content to use as key content in construction of a query;

select, responsive to the recommendation, the one or more segments of the plain text as key content for construction of the query;

construct the query to match the one or more segments in one or more selected fields of an electronic message identified by one or more match criteria, the one or more selected fields identifying one or more of a sender, recipient, subject, attachment or body of the electronic message;

execute the query in the messaging system for one or more other malicious messages corresponding to the reported malicious message; and identify in the messaging system the one or more other malicious messages corresponding to the reported malicious message.

12. The system of claim 11, wherein the one or more servers are further configured to select content from the malicious message.

13. The system of claim 11, wherein the one or more servers are further configured to parse the plain text from the content using a parser to parse out the plain text from content corresponding to authoring language used to create the content.

14. The system of claim 11, wherein the recommendation is based at least on one or more of the following identified segments commonly found among variations of malicious messages: i) unusual phrases in a body of a message that do not occur commonly in regular messages within an organization; (ii) the presence of misspelt words; (iii) irregular punctuation or grammatical error; and (iv) removal of forenames or surnames from the content of the message.

15. The system of claim 11, wherein the one or more servers are further configured to identify the one or more match criteria for matching the selected one or more segments to one or more messages recommended by the one or more servers.

16. The system of claim 11, wherein the one or more servers are further configured to construct the query based at least on the one or more segments of the plain text and the one or more match criteria.

17. The system of claim 16, wherein the one or more servers are further configured to a construct the query to be formatted into a single query that searches a body of one or more messages for a collection of the one or more segments of the plain text matching the one or more match criteria.

18. The system of claim 11, wherein the one or more servers are further configured to validate the query based at least on a measure of success in identifying the one or more other malicious messages corresponding to the reported malicious message, wherein the message of success is compared to a threshold, wherein the recommendation engine provides one or more recommendation to modify the query to perform additional searches until the search exceeds the threshold.

19. The system of claim 11, wherein the one or more servers are further configured to quarantine the one or more other malicious messages identified from the query.

20. The system of claim 11, wherein the one or more servers are further configured to monitor the one or more other malicious messages identified by the query to determine a number of false positives arising from the query.

* * * * *